US010564408B2

(12) United States Patent
Vartiainen et al.

(10) Patent No.: US 10,564,408 B2
(45) Date of Patent: Feb. 18, 2020

(54) MICROSCOPE COMPRISING A MOVABLE OBJECTIVE-CAMERA SYSTEM WITH ROLLING SHUTTER CAMERA SENSOR AND A MULTI-COLOR STROBE FLASH AND METHOD FOR SCANNING MICROSCOPE SLIDES WITH PROPER FOCUS

(71) Applicant: Grundium Oy, Tampere (FI)

(72) Inventors: Markus Vartiainen, Tampere (FI); Janne Haavisto, Kangasala (FI); Matti Pellikka, Lempäälä (FI); Heikki Jantunen, Tampere (FI)

(73) Assignee: GRUNDIUM OY, Tampere (FI)

( * ) Notice: Subject to any disclaimer, the term of this patent is extended or adjusted under 35 U.S.C. 154(b) by 0 days.

(21) Appl. No.: 15/895,522

(22) Filed: Feb. 13, 2018

(65) Prior Publication Data

US 2018/0321481 A1   Nov. 8, 2018

(30) Foreign Application Priority Data

May 8, 2017 (FI) ...................................... 20175410

(51) Int. Cl.
*G02B 21/36* (2006.01)
*G02B 21/26* (2006.01)
(Continued)

(52) U.S. Cl.
CPC ........... *G02B 21/361* (2013.01); *G01Q 20/02* (2013.01); *G01Q 30/02* (2013.01); *G02B 7/38* (2013.01);
(Continued)

(58) Field of Classification Search
CPC ...... G02B 21/361; G02B 21/26; G02B 21/34; G02B 21/0036; G02B 21/245;
(Continued)

(56) References Cited

U.S. PATENT DOCUMENTS 5,912,699 A * 6/1999 Hayenga ................ G02B 21/26
                                                    348/132
6,542,180 B1 * 4/2003 Wasserman ........ G01N 21/8806
                                                    348/131
(Continued)

FOREIGN PATENT DOCUMENTS

EP      2282230 A2    2/2011
WO      0144856 A1    6/2001
(Continued)

OTHER PUBLICATIONS

Finnish Patent and Registration Office, Search Report, Application No. 20175410, dated Jan. 2, 2018, 2 pages.
(Continued)

*Primary Examiner* — Twyler L Haskins
*Assistant Examiner* — Akshay Trehan
(74) *Attorney, Agent, or Firm* — Zeigler IP Law Group, LLC

(57) ABSTRACT

An apparatus for scanning microscope slides is provided. The apparatus includes an objective; a specimen stage; a camera sensor configured to capture a first plurality of images at a first rate while focus is changed in continuous motion; and a flash unit configured to flash at a second rate, wherein the first rate and the second rate are synchronized.

15 Claims, 10 Drawing Sheets

(51) Int. Cl.
  *G02B 21/34*    (2006.01)
  *G02B 21/00*    (2006.01)
  *G02B 21/06*    (2006.01)
  *G02B 21/12*    (2006.01)
  *H04N 5/232*    (2006.01)
  *H04N 5/235*    (2006.01)
  *G02B 21/24*    (2006.01)
  *G02B 7/38*     (2006.01)
  *G01Q 20/02*    (2010.01)
  *G01Q 30/02*    (2010.01)

(52) U.S. Cl.
  CPC ......... *G02B 21/0036* (2013.01); *G02B 21/06* (2013.01); *G02B 21/12* (2013.01); *G02B 21/242* (2013.01); *G02B 21/26* (2013.01); *G02B 21/34* (2013.01); *G02B 21/36* (2013.01); *G02B 21/365* (2013.01); *G02B 21/367* (2013.01); *H04N 5/2353* (2013.01); *H04N 5/2354* (2013.01); *H04N 5/23212* (2013.01); *H04N 5/232133* (2018.08); *G02B 21/008* (2013.01); *G02B 21/245* (2013.01)

(58) Field of Classification Search
  CPC ........ G02B 21/06; G02B 21/008; G02B 7/38; H04N 5/23212; H04N 5/232127; H04N 5/2353; H04N 5/2354; H04N 5/2356
  USPC ........................................ 396/432; 348/79–80
  See application file for complete search history.

(56)         References Cited

U.S. PATENT DOCUMENTS

| | | | | |
|---|---|---|---|---|
| 8,237,835 | B1* | 8/2012 | Muller ................. | A61B 3/1025 250/201.9 |
| 2005/0219688 | A1* | 10/2005 | Kawano ............... | G02B 21/002 359/385 |
| 2007/0069106 | A1* | 3/2007 | Krief .................... | G02B 21/244 250/201.3 |
| 2009/0103792 | A1* | 4/2009 | Rahn ................... | G01N 21/4795 382/131 |
| 2014/0347460 | A1* | 11/2014 | Richfield ............. | G02B 21/367 348/79 |
| 2014/0368726 | A1* | 12/2014 | Gladnick ........... | G01B 11/0608 348/349 |
| 2015/0215547 | A1* | 7/2015 | Muller ................. | G01J 3/2803 348/598 |
| 2015/0350573 | A1* | 12/2015 | Toda ..................... | H04N 5/341 348/241 |
| 2017/0023786 | A1* | 1/2017 | Goodwin ............. | G02B 21/365 |
| 2017/0061601 | A1* | 3/2017 | Bryll .................... | G02B 3/0081 |
| 2017/0078549 | A1* | 3/2017 | Emtman .............. | H04N 5/2351 |
| 2017/0176338 | A1* | 6/2017 | Wu ...................... | G01N 21/6458 |
| 2017/0318216 | A1* | 11/2017 | Gladnick ............... | G02B 7/006 |

FOREIGN PATENT DOCUMENTS

WO         2011064609 A2     6/2011
WO         WO2011/064609     *    6/2011  ............. G02B 21/36

OTHER PUBLICATIONS

Bravo-Zanoguera, Miguel, et al. "Dynamic autofocus for continuous-scanning time-delay-and-integration image acquisition in automated microscopy", Journal of Biomedical Optics, vol. 12, No. 03, Jan. 1, 2007, pp. 034011-1 to 034011-16.

Extended European Search Report of European Patent Application No. 18397515.0, dated Sep. 17, 2018, 7 pages.

Schenk, Friedrich, et al. "High-speed microscopy of continuously moving cell culture vessels", Scientific Reports, Open Article, vol. 6, No. 01, Sep. 26, 2016, 9 pages.

* cited by examiner

910 — changing focus of a scanning apparatus in continuous motion

920 — capturing, by a camera sensor, a first plurality of images from a first position at a first rate while the focus is changed in continuous motion 930 — flashing a flash unit at a second rate, wherein the first rate and the second rate are synchronized

Fig. 9

MICROSCOPE COMPRISING A MOVABLE OBJECTIVE-CAMERA SYSTEM WITH ROLLING SHUTTER CAMERA SENSOR AND A MULTI-COLOR STROBE FLASH AND METHOD FOR SCANNING MICROSCOPE SLIDES WITH PROPER FOCUS

TECHNICAL FIELD

The aspects of the disclosed embodiments relate to the field of microscopy.

BACKGROUND

Microscopes are instruments that may be used to aid humans to see a magnified view of small specimens, e.g. cells or wood fibres. There are various microscopes in the market, e.g. optical microscopes and electron microscopes. It may be desirable for a user to acquire digital images of the specimen.

SUMMARY

As different aspects of the present disclosure, we present an apparatus, a method, and a computer program product, which are characterized in what will be presented in the independent claims.

According to a first aspect, there is provided an apparatus comprising an objective; a specimen stage for a specimen; a camera sensor configured to capture a first plurality of images at a first rate while focus is changed in continuous motion; and a flash unit configured to flash at a second rate, wherein the first rate and the second rate are synchronized.

According to a second aspect, there is provided a method comprising changing focus in continuous motion; capturing, by a camera sensor, a first plurality of images from a first position at a first rate while the focus is changed in continuous motion; and flashing a flash unit at a second rate, wherein the first rate and the second rate are synchronized.

According to a third aspect, there is provided a computer program product embodied on a non-transitory computer readable medium, comprising computer program code configured to, when executed on at least one processor, cause an apparatus to change focus in continuous motion; capture, by a camera sensor, a first plurality of images from a first position at a first rate while the focus is changed in continuous motion; and flash a flash unit at a second rate, wherein the first rate and the second rate are synchronized.

The dependent claims disclose advantageous embodiments of the present disclosure.

BRIEF DESCRIPTION OF THE DRAWINGS

In the following examples, the embodiments of the present disclosure will be described in more detail with reference to the appended drawings in which

FIG. 9 shows, by way of example, a flowchart of a method for scanning microscope slides.

The drawings are schematic.

DETAILED DESCRIPTION

Optical microscopes use light and a system of lenses to obtain a magnified view of an object. Various illumination techniques may be used in optical microscopy, e.g. bright field, dark field, phase contrast and polarized light. The following examples focus on apparatuses using bright field technique, but the examples are not limited to bright field technique.

Figure 1:
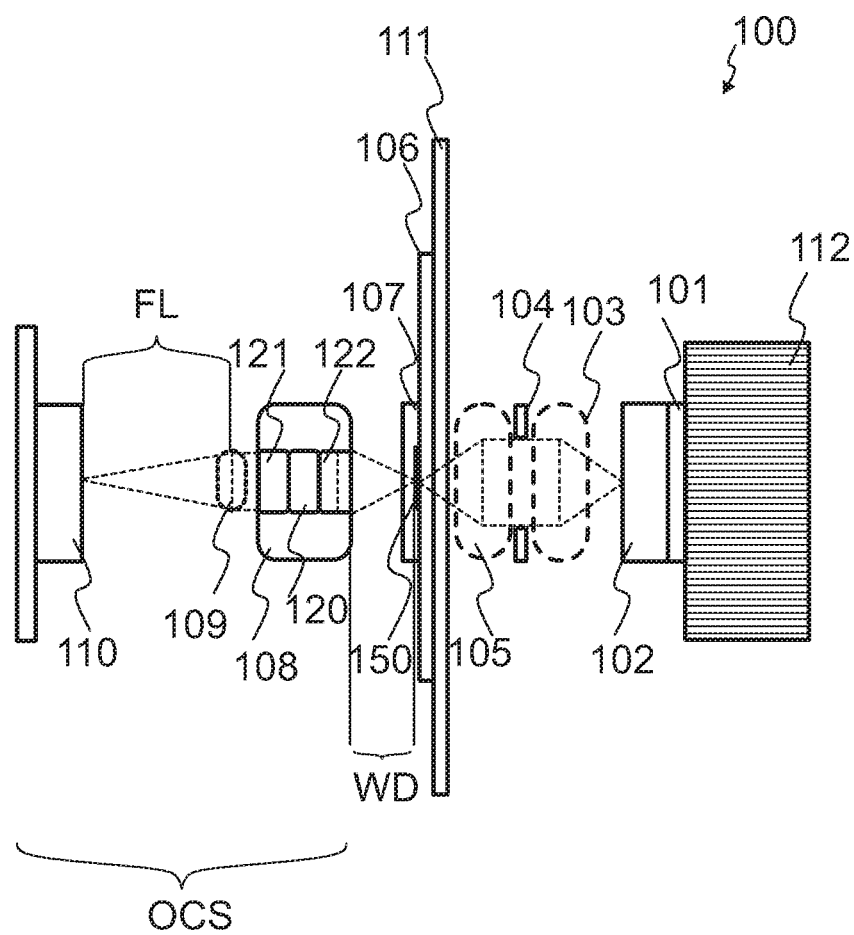
FIG. 1 shows, by way of example, components of a scanning apparatus.

FIG. 1 shows, by way of example, components of a scanning apparatus 100. The scanning apparatus 100 may comprise a light source 101. The light source may be e.g. a halogen lamp or a light emitting diode (LED). The scanning apparatus 100 may comprise a radiator 112 for cooling purposes. Thermal energy may at least partly be transferred from the scanning apparatus 100 to surrounding air via body of the scanning apparatus 100. The scanning apparatus 100 may comprise a diffuser 102 for forming a uniform light source. The scanning apparatus 100 may comprise a collector lens 103 for gathering light from the diffuser 102. The scanning apparatus 100 may comprise a diaphragm 104. The diaphragm may comprise an aperture. Size of the aperture may be constant or adjustable. The diaphragm 104 may be e.g. a rotating disk comprising different sized apertures. The diaphragm may comprise a blade structure with movable blades for adjusting the size of the aperture. The size of the aperture regulates the amount of light that passes through into a specimen under investigation. The scanning apparatus 100 may comprise a condenser lens 105 for focusing light to a specimen 150.

The specimen 150 may be attached on a slide 106. The scanning apparatus 100 may comprise a stage 111 for the slide 106. The stage may comprise a hole for passing light through to illuminate the specimen 150. The specimen 150 may be set under a cover glass 107.

The scanning apparatus 100 may comprise an objective 108 for collecting light from the specimen 150. The objective may be characterized by its magnification and numerical aperture. The objective comprises a plurality of lenses 120, 121, 122. Distance between the objective 108 and the specimen is a working distance WD.

The objective 108 may be an infinity corrected objective. In infinity corrected objective systems an image distance is set to infinity. In infinity corrected objective systems a tube lens may be used to focus the image. The scanning apparatus 100 may comprise a tube lens 109. The tube lens focuses the light passing through the objective on a camera sensor 110. The tube lens 109 may shorten an optical path of the light. By using tube lens to shorten the optical path of the light, the size of the scanning apparatus 100 may be reduced. The tube lens 109 may reduce magnification. The tube lens may be one lens or a system of more than one lens. The tube lens 109 may be a shape-changing lens, i.e. the focus is changed by changing the shape of the lens. An example of a shape-changing lens is a liquid lens. The liquid lens is a lens structure comprising two liquids that don't mix with each other, e.g. oil and water. Curvature of the liquid-liquid interface may be changed by applying electricity to the lens structure. Thus, the focal length FL of the liquid lens may be adjusted electronically. Another example of a shape-changing lens is based on a combination of optical fluids and a polymer membrane. A container is filled with an optical fluid and sealed off with a thin, elastic polymer membrane. The shape of the lens is changed by pushing a circular ring onto the center of the membrane or by exerting a pressure to the outer part of the membrane or by pumping liquid into or out of the container. The ring may be moved manually or electrically.

The scanning apparatus 100 may comprise a camera sensor 110 for capturing images of the specimen. The camera sensor may be a e.g. a charge-coupled device (CCD), a complementary metal-oxide semiconductor (CMOS) or an electron-multiplying CCD (EMCCD).

Figure 2:
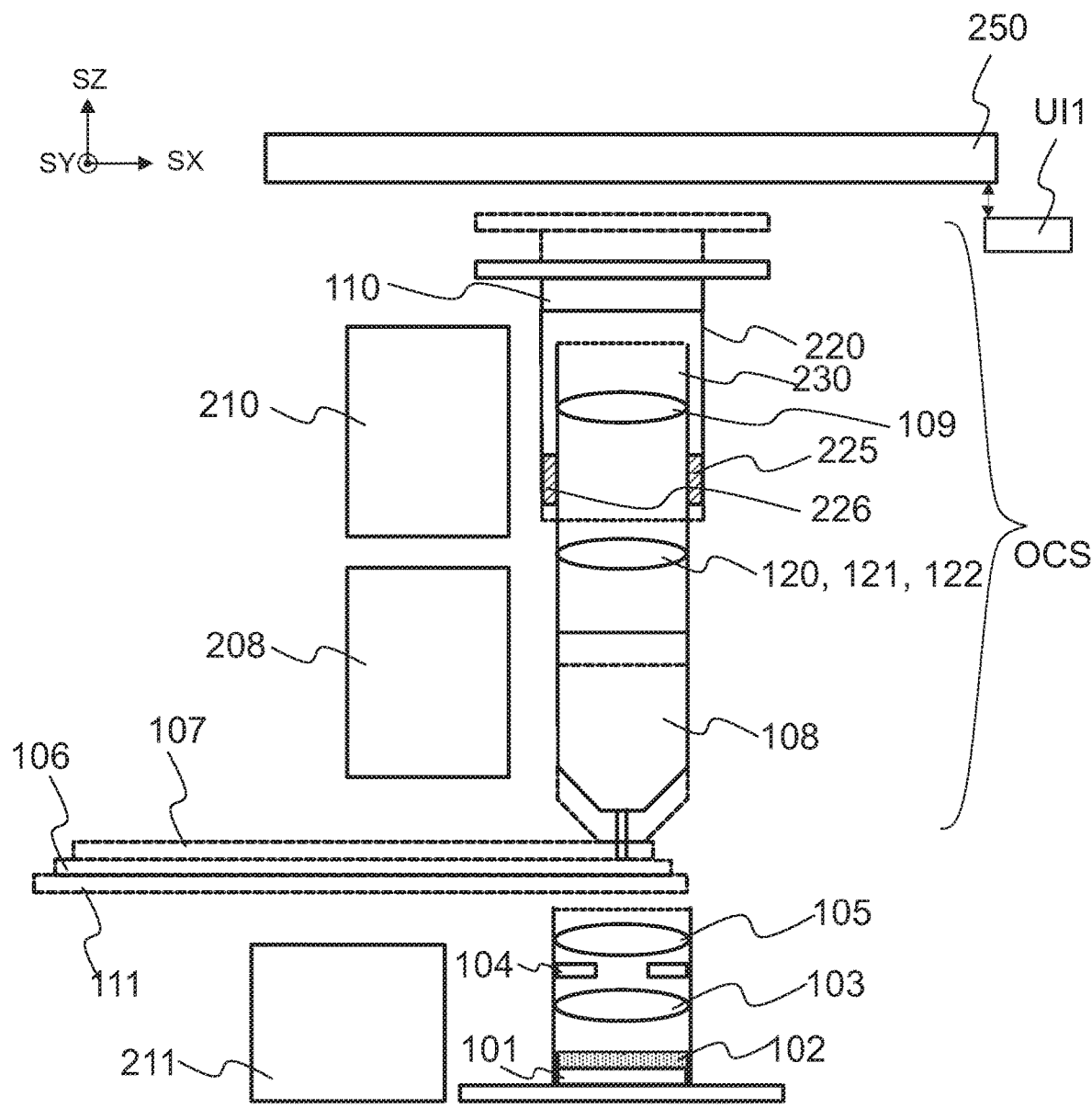
FIG. 2 shows, by way of example, components of a scanning apparatus.

FIG. 2 shows, by way of example, components of a scanning apparatus 100. The stage 111 may be configured to change position. The scanning apparatus 100 may comprise a motor 211 for moving the stage 111. The stage 111 may be configured to move in different directions, e.g. x, y and z. Z-axis is determined as parallel to the optical axis. X-axis and y-axis are orthogonal to the z-axis.

The objective-camera system OCS may be configured to change position. The scanning apparatus 100 may comprise a motor 208 for moving the objective-camera system OCS. The objective-camera system OCS may be moved along z-axis.

The working distance WD may be changed by moving the stage 111 along the z-axis and/or by moving the objective-camera system OCS along the z-axis.

An object point and image point of a lens system are conjugate points. When the object is in focus, an image of the object and the object are positioned in the conjugate points. In other words, if the specimen and the camera sensor are positioned at the conjugate points, the formed image is focused and sharp. However, if the position of the specimen is changed, the image formed on the camera sensor is not focused. Focus may be disturbed e.g. due to mechanical vibration from the environment. If the specimen stage is tilted, at least some parts of the specimen may be out of focus. Different colours of the specimen may be focused at different distances (axial/longitudinal chromatic aberration). Field curvature may cause a situation where at least some parts of the specimen are not in focus. Field curvature is caused by curved nature of optical elements.

To get properly focused and sharp images of the specimen, focus of the system may be adjusted. The focus may be changed e.g. by changing the distance between the objective 108 and the specimen, i.e. the working distance WD and/or by changing the focal length of one of the lens element within the objective-tube lens system and/or by changing the distance between the camera sensor 110 and the tube lens 109.

The focus of the system may be changed e.g. by changing the working distance WD. The working distance WD may be changed e.g. by moving the objective-camera system OSC along the z-axis and/or by moving the specimen stage 111 along the z-axis. Objectives with magnification of approximately 20× or more may be considered as high power objectives. High power microscope objectives have a short depth of field (e.g. less than 4 µm) in the specimen side (object side). Because of the short depth of field of the objective in the specimen side, even a small change (i.e. approximately the same as the depth of field) in the working distance WD will cause a situation wherein the specimen is not in focus.

The focus of the system may be changed e.g. by changing the distance between the camera sensor 110 and the tube lens 109. The distance between the camera sensor 110 and the tube lens 109 may be changed e.g. by moving the camera sensor 110 along the z-axis and/or by changing the focal length of the liquid tube lens. The camera sensor 110 may be configured to change position along the z-axis. The scanning apparatus 100 may comprise a motor 210 for moving the camera sensor 110. High power microscope objectives have a long depth of focus on the camera side (image side). Because of the long depth of focus of the objective in the camera side, small change in the position of the camera sensor in z-direction will not cause a situation wherein the specimen is not in focus.

Thus, adjusting fine focus by moving the camera may be easier compared to fine focusing by changing the WD. The motor for moving the camera sensor may have low accuracy. Manufacturing motors having low accuracy is simpler than manufacturing motors with high accuracy, and thus the motors with low accuracy may be cheaper compared to motors with high accuracy. Coarse focus may be adjusted by moving the objective-camera system OCS and/or the specimen stage. The motor for moving the objective-camera system OCS and/or the specimen stage may have relatively low accuracy. Coarse focus may be adjusted by moving the objective-camera system OCS and/or the specimen stage such that the distance between the specimen and the objective is at designed working distance.

Dust is undesirable in the space, where the camera sensor 110 is situated. The camera sensor 110 may be situated inside an external pipe 220. The camera sensor 110 and the external pipe 220 may be configured to move in relation to an internal pipe 230. Because of the movement of the external pipe 220 in relation to the internal pipe 230, dust may be sucked in to the space, where the camera sensor 110 is situated. Dust filter(s) 225, 226 may be situated in the space between the external pipe 220 and the internal pipe 230 for filtering dust.

The scanning apparatus may comprise a control unit 250. The control unit may comprise or may be connected to a user interface UI1. The user interface may receive user input e.g. through a touch screen and/or a keypad. Alternatively, the user interface may receive user input from internet or smartphone via a communication connection. The communication connection may be e.g. a Bluetooth connection or a WiFi connection. The control unit may comprise e.g. a single board computer. The control unit may be configured to control operation of the scanning apparatus. For example, the control unit may be configured to operate the motors 208, 210, 211.

The scanning apparatus 100 may comprise a flash. The light source 101 may be configured to function as a flash. The flash may be e.g. a LED flash. The LED flash may comprise LEDs of different colours. Acquiring several frames each exposed with LED flash of a different colour enables proper focusing of different colours of the specimen. The flash may be a strobe flash producing short light pulses at high frequency. The flash may be configured to produce a light pulse in synchronization with image capturing. The use of flash may eliminate motion blur originating from mechanical vibration from investigation environment. Use of heavy investigation tables or heavy microscope structures which in part may eliminate motion blur may be avoided. Heavy investigation tables may be unavailable in distant destinations where the scanning apparatus 100 may be used. The scanning apparatus 100 may have a lightweight structure and it may be easy to carry along and set up for use in distant destinations. Since the light does not need to be switched on during the whole investigation/scanning, energy may be saved. Use of flash light reduces heat production compared to a situation when an investigation light is switched on during the whole investigation, and thus reduces the need for cooling.

Figure 3A:
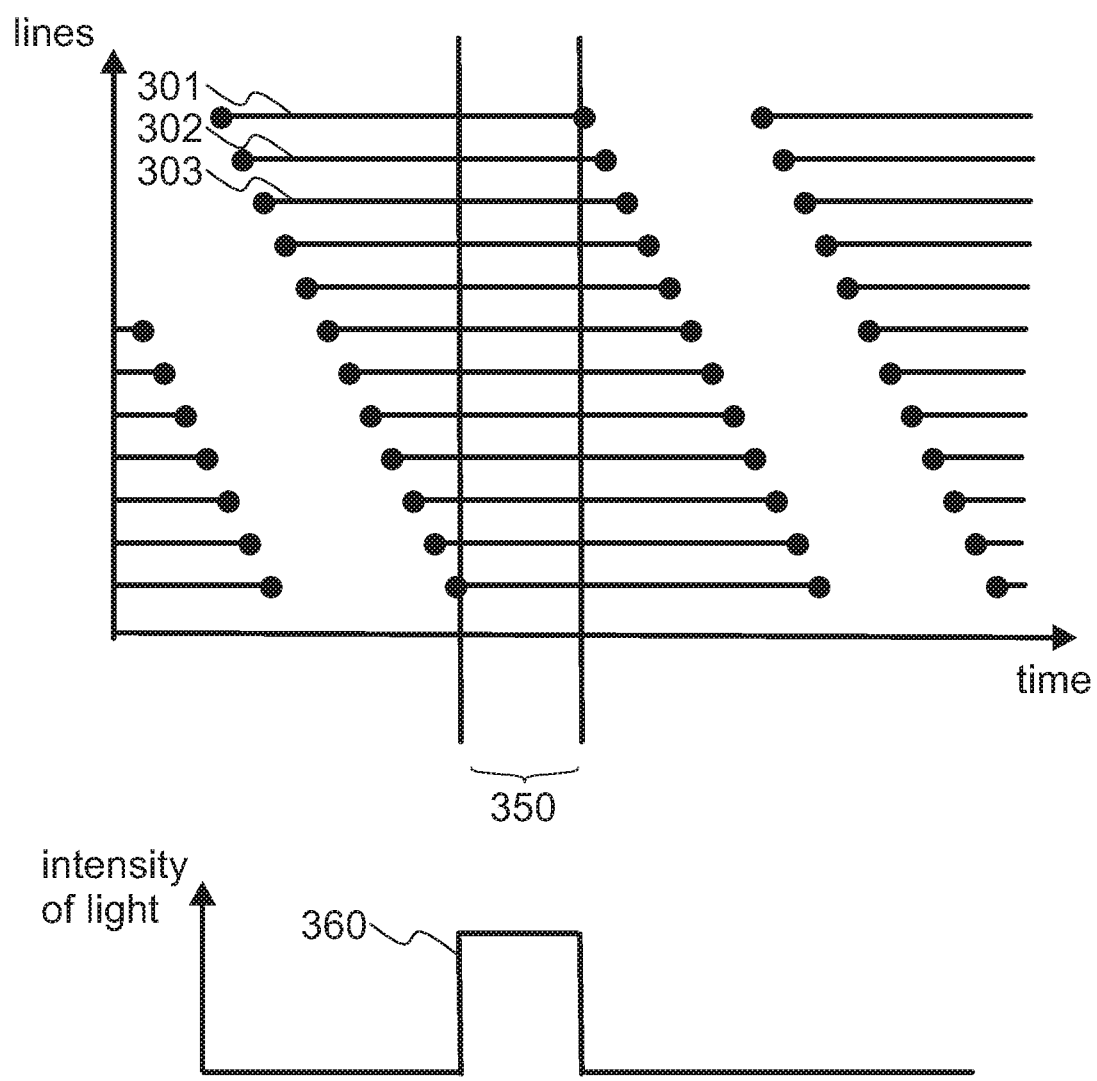
FIG. 3a shows, by way of example, a timing diagram of line exposure with a rolling shutter.

The camera may be a digital camera. The digital camera may be equipped with an electronic rolling shutter or an electronic global shutter. Global shutter exposes an entire frame at the same instant. When using a rolling shutter, exposure of the image lines does not begin at the same instant. FIG. 3a shows, by way of example, timing diagram of line exposure with a rolling shutter. When using a rolling shutter, readout of the image lines 301, 302, 303 is carried out sequentially, i.e. line by line. Lines may be e.g. horizontal or vertical. After completing readout of one image line 301, exposure of the next image line 302 may begin. Thus, exposures of the image lines 301, 302, 303 may be overlapping in time. The flash may be configured to produce a light pulse 360 in synchronization with image capturing using rolling shutter. Time window 350 in FIG. 3a marks the time when each line of the image are exposed simultaneously. Quality of images which are captured by using a rolling shutter camera (rolling shutter readout) such that line exposure is synchronized with the flash exposure such that during the flash pulse 360 each line of the image is exposed simultaneously, may be as good as quality of images acquired using a global shutter camera. The quality of images may be characterized e.g. by resolution (e.g. line-pairs/mm) and/or modulation transfer function (MTF) (contrast within line-pairs/mm, ability to transfer contrast at a particular resolution from the object to the image). Technical implementation of a rolling shutter may be easier than that of a global shutter. Rolling shutter may be cheaper than a global shutter. Rolling shutter may require less space than a global shutter. Thus, smaller physical size of the microscope may be achieved using a rolling shutter rather than a global shutter.

When a specimen is investigated in distant destinations, use of heavy investigation tables and/or heavy microscope structures may be cumbersome. Use of heavy investigation tables and/or heavy microscope structures may be avoided using an apparatus according to the present application. The apparatus may comprise an objective 108. The apparatus may comprise a specimen stage 111 for the specimen. The apparatus may comprise a camera sensor 110. The camera sensor may be configured to capture a first plurality of images at a first rate while the focus is changed in continuous motion. The apparatus may comprise a flash unit 101. The flash unit may be configured to flash at a second rate. The first rate and the second rate may be synchronized. The use of flash may eliminate motion blur originating from mechanical vibration from investigation environment. Heavy investigation tables and/or heavy microscope structures may be unavailable in distant destinations where the scanning apparatus 100 may be used. The scanning apparatus 100 may have a lightweight structure and it may be easy to carry along and set up for use in distant destinations. With microscopic slide scanner as disclosed herein good quality images may be achieved. The quality of images may be characterized e.g. by resolution (e.g. line-pairs/mm) and/or modulation transfer function (MTF) (contrast within line-pairs/mm, ability to transfer contrast at a particular resolution from the object to the image).

Focusing may be carried out e.g. by changing the working distance WD and/or the distance between the tube lens and the camera sensor along the z-axis. The distances may be changed in continuous motion. Motors having relatively low accuracy may be used to produce continuous motion. Continuous focus motion may be beneficial, since scanning the specimen may be faster compared to step-by-step motion in which starting and stopping the motor may consume time. In continuous motion, starting hysteresis at the beginning of each step and residual vibration at the end of the step may be avoided. When changing focus in continuous motion, image capture need not be synchronized with mechanical motion of the objective-camera system and/or the camera sensor and/or the stage. Thus, position accuracy may be increased when changing focus in continuous motion. Images may be captured in various focus positions during continuous focus motion. Strobe flash may be synchronized with image capture.

Figure 3B:
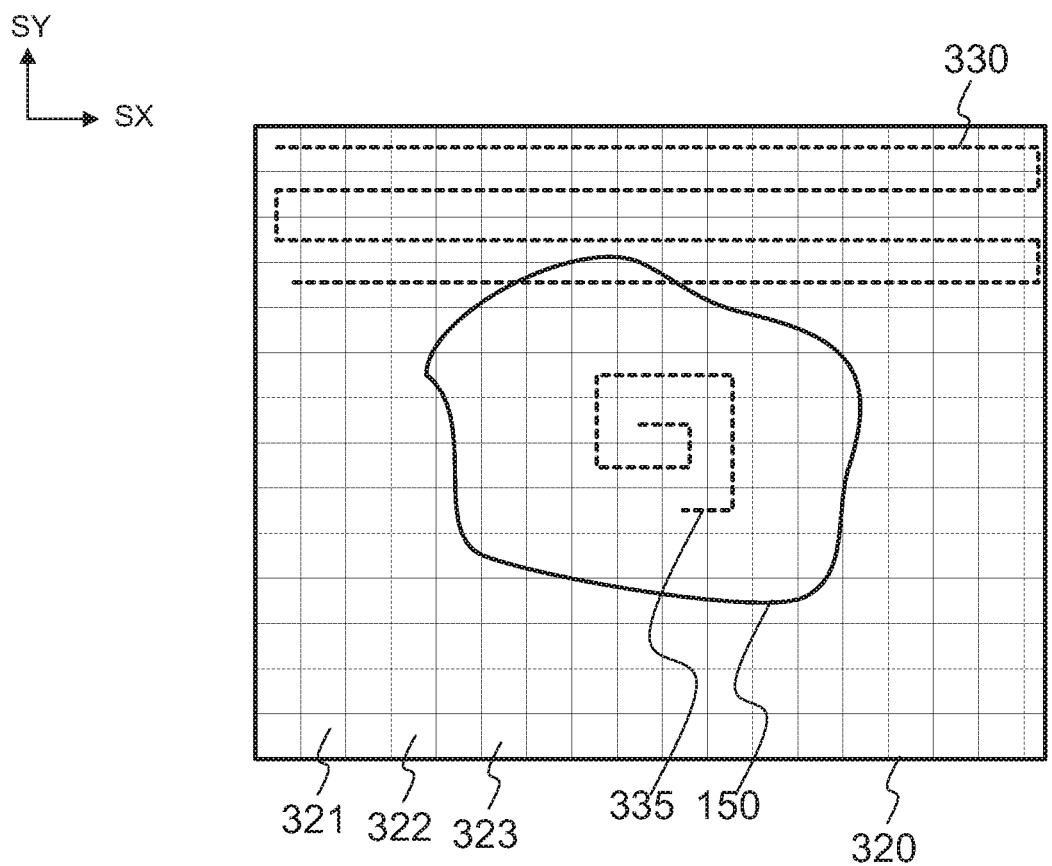
FIG. 3b shows, by way of example, a top view of a specimen.

FIG. 3b shows, by way of example, a top view of a specimen 150. A shape of an area 320 of which an image may be formed may be e.g. rectangular, oval or some other shape. The area to be scanned may be determined by using information acquired with a secondary camera (see FIG. 8). The area 320 may be chosen to comprise at least a part of the specimen 150. The area to be imaged may be divided into zones 321, 322, 323. An image of the area 320 comprising at least a part of the specimen 150 may be formed by imaging individually the zones 321, 322, 323 to obtain sub-images of the specimen. Image lines shown in FIG. 3a may present an image frame of one zone, e.g. zone 321. Size of one zone 321, 322, 323 may depend on which magnification is used. Several sub-images may be acquired from different positions in x/y plane. The sub-images may be stitched to form a final image covering the whole specimen or selected zones of the specimen. FIG. 3b shows, by way of example, scanning patterns that may be used when capturing the sub-images. A dashed line 330 shows a line-by-line scanning pattern in x/y plane and a dashed line 335 shows a spiral scanning pattern in x/y plane.

Several images in different focus distances may be acquired from different positions, i.e. zones 321, 322, 323 in x/y plane. From the acquired set of images, properly focused data may be collected for each colour, field curvature zone and/or stage tilt zone. Different colours may be focused at different distances. When acquiring multiple images in different focus distances using a multi-colour LED flash, it may be possible to choose a properly focused image for each colour. Different zones of the images may be focused at different distances because of the field curvature and/or specimen stage tilt. When acquiring multiple images with different focus, it may be possible to choose a properly focused image for each zone. Sub-images of the specimen may be combined by stitching to form a final image. Stitching process may comprise e.g. image registration, image warping, and blending of the images. In image registration, for each sub-image a geometric transformation is determined which maps the sub-image to the final image so that its content matches to the content of the neighbouring sub-images in the final image. The geometric transformation may contain a perspective transformation as well as lens distortion correction. The parameters of the transformation may be determined by matching corresponding features between the neighbouring sub-images, and by detecting features in the images of calibration targets. In image warping, the determined geometric transformations are applied to the sub-images, producing patches of the final image whose image content come from the sub-images, but their location, orientation, and geometric proportions are altered according to the transformations. In image blending, the possible visible intensity discontinuities between the sub-image patches in the final image are being faded to produce a seamless final image.

When performing the scanning operation by acquiring multiple images with different focus, a separate and time consuming focusing phase and creation of focusing map for scanning may be avoided.

Figure 4:
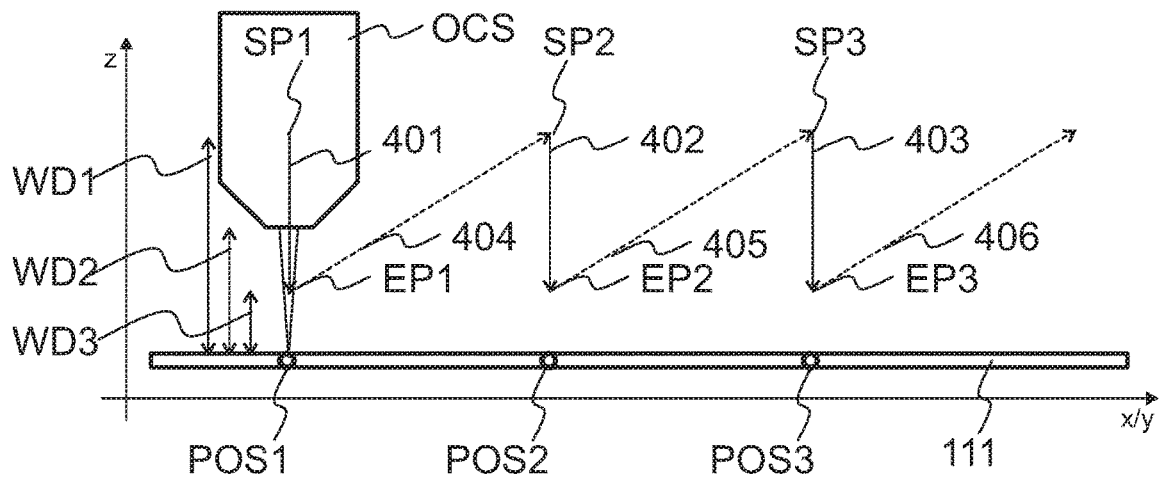
FIG. 4 shows, by way of example, a moving pattern of an objective-camera system in relation to the specimen stage.

FIG. 4 shows, by way of example, a moving pattern of an objective-camera system OCS in relation to the specimen stage. The objective-camera system OCS may be configured to move along the z-axis. The specimen may be set on a glass on the stage 111. The working distance WD1, WD2, WD3 may be changed e.g. by moving the objective-camera system OCS in continuous motion along the z-axis. The objective-camera system OCS may be moved in continuous motion from a first starting point SP1 to a first end point EP1. Alternatively or in addition, the distance between the objective and the specimen may be changed by moving the stage along the z-axis. The camera sensor may be configured to capture a plurality of images at different focus distances from a first position POS1 in x-y plane. The camera sensor may be configured to capture images at high frame rate while the working distance is changing in continuous motion. The flash may be synchronized with image capture. Solid arrows 401, 402, 403 describe movement of the objective-camera system OCS in relation to the stage 111 during which images are captured. Dashed arrows 404, 405, 406 describe movement of the objective-camera system OCS in relation to the stage 111 during which images are not captured. At least the x/y-component of the movement described by the dashed arrows 404, 405, 406 is realized by moving the specimen stage.

The camera sensor may be configured to capture a first plurality of images at different working distances from the first position POS1. Capturing the first plurality of images at different focus distances means that an image A of the first plurality of images may be captured at working distance 1 (WD1), an image B of the first plurality of images may be captured at working distance 2 (WD2), and image C of the first plurality of images may be captured at working distance 3 (WD3). The first plurality of images may comprise images each captured at different working distance from the first position POS1. The image frames captured at different working distances forms an image stack. When starting to capture a first plurality of images at the first starting point SP1, the specimen is usually not in focus, but the user knows if one should increase or decrease the working distance to get the specimen in focus. Then, more images are captured at different working distances. Focus of the captured images may be compared, e.g. using the MTF. By comparing the focus of the captured images, it is noticed when the specimen is in focus (a focus peak is achieved) and when the specimen starts to get out of focus when approaching the first end point EP1. The process of capturing plurality of images described in this paragraph applies for capturing the second plurality of images and the third plurality of images below, mutatis mutandis.

The specimen stage may be moved in x-y plane such that the second position POS2 to be imaged is in correct position under the objective. The objective-camera system OCS may be configured to reach a second starting point SP2 from which to start the focus motion along the z-axis towards a second end point EP2. The objective-camera system OCS may be configured to move in continuous motion along the z-axis from the second starting point SP2 to the second end point EP2. The camera sensor may be configured to capture a second plurality of images at different working distances from the second position POS2. The flash may be synchronized with image capture.

The specimen stage may be moved in x-y plane such that the third position POS3 to be imaged is in correct position under the objective. The objective-camera system OCS may be configured to reach a third starting point SP3 from which to start the focus motion along the z-axis towards a third end point EP3. The objective-camera system OCS may be configured to move in continuous motion along the z-axis from the third starting point SP3 to the third end point EP3. The camera sensor may be configured to capture a third plurality of images at different working distances from the third position POS3. The flash may be synchronized with image capture.

Figure 5:
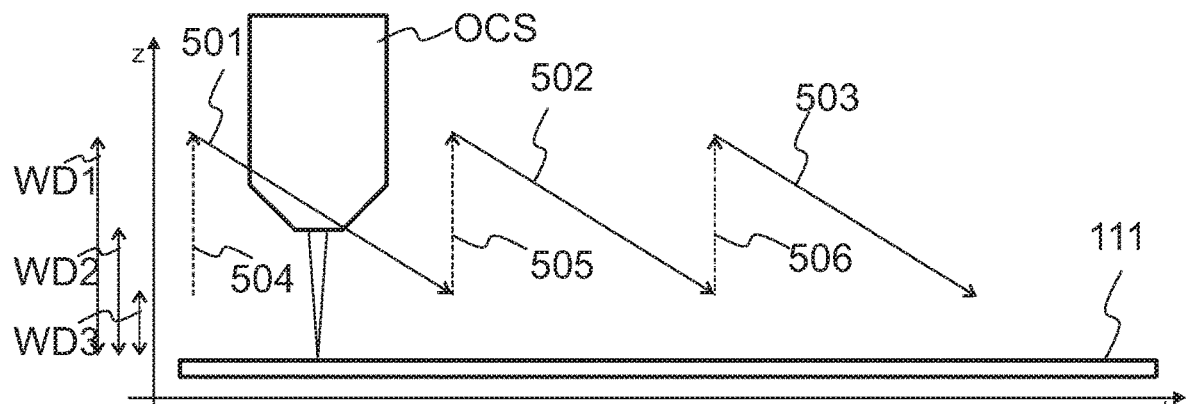
FIG. 5 shows, by way of example, a moving pattern of an objective-camera system in relation to the specimen stage.

FIG. 5 shows, by way of example, a moving pattern of an objective-camera system OCS in relation to the specimen stage. The objective-camera system OCS may be configured to move along the z-axis. The specimen may be set on a glass on the stage 111. The stage 111 may be configured to move in x/y plane. The stage 111 and the objective-camera system OCS may be configured to move simultaneously. The working distance WD1, WD2, WD3 may be changed e.g. by moving the objective-camera system OCS in continuous motion along the z-axis. Alternatively or in addition, the distance between the specimen and the objective may be changed by moving the stage along the z-axis. The objective-camera system OCS may be configured to move from a starting point of a focus range towards the end point of the focus range. The camera sensor may be configured to capture images at high frame rate while the objective-camera system is in continuous motion along the z-axis and the stage is in continuous motion in x/y plane. The flash may be synchronized with the image capture. When end of the focus range is reached, the objective-camera system OCS may be configured to move to the next starting point of the next focus range. Solid arrows 501, 502, 503 describe movement of the objective-camera system OCS in relation to the stage 111 during which images are captured. Dashed arrows 504, 505, 506 describe movement of the objective-camera system OCS in relation to the stage 111 during which images are not captured. At least the x/y-component of the movement described by the dashed arrows 504, 505, 506 is realized by moving the specimen stage. Scanning time with sawtooth focus motion pattern may be decreased.

Figure 6:
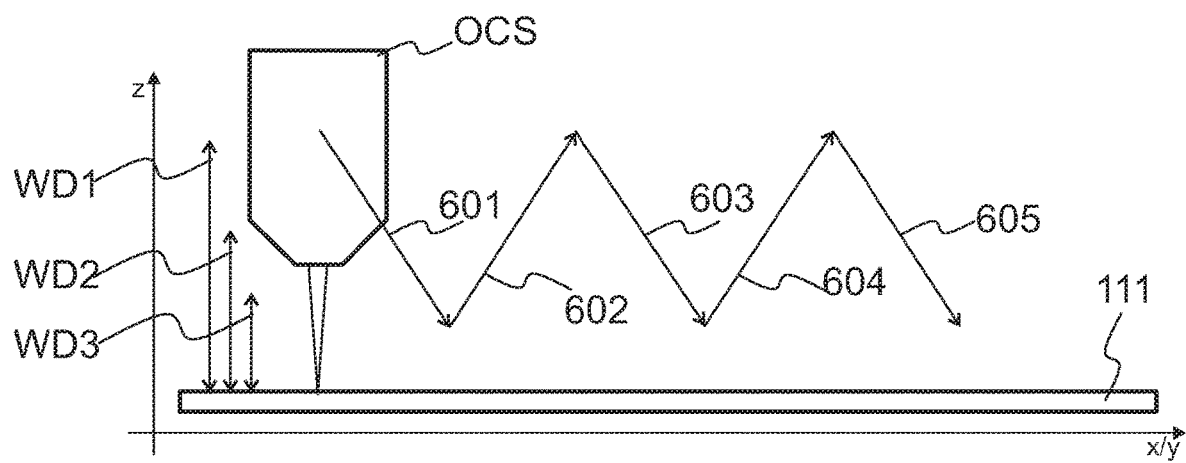
FIG. 6 shows, by way of example, a moving pattern of an objective-camera system in relation to the specimen stage.

FIG. 6 shows, by way of example, a moving pattern of an objective-camera system OCS in relation to the specimen stage. The objective-camera system may be configured to move along the z-axis. The stage may be configured to move in x/y plane. The stage and the objective-camera system may be configured to move simultaneously. Alternatively or in addition, the distance between the specimen and objective may be changed by moving the stage along the z-axis. The objective-camera system OCS may be configured to move from a starting point of a focus range towards the end point of the focus range. The camera sensor may be configured to capture images at high frame rate while the objective-camera system OCS is in continuous motion along the z-axis and the stage is in continuous motion in x/y plane. The flash may be synchronized with the image capture. When end of the focus range is reached, the objective-camera system OCS may be configured to move to the starting point of the focus range. While the objective-camera system OCS is moved to the starting point of the focus range, the stage is in continuous motion in x/y plane and the camera sensor may be configured to capture images at high frame rate. Solid arrows 601, 602, 603 describe movement of the objective-camera system OCS in relation to the stage 111 during which images are captured. The resulting moving pattern may be triangular as shown in FIG. 6 or e.g. sinusoidal. At least the x/y-component of the movement described by the dashed arrows 604, 605, 606 is realized by moving the specimen stage. Scanning time with triangular or sinusoidal focus motion pattern may be decreased.

Figure 7:
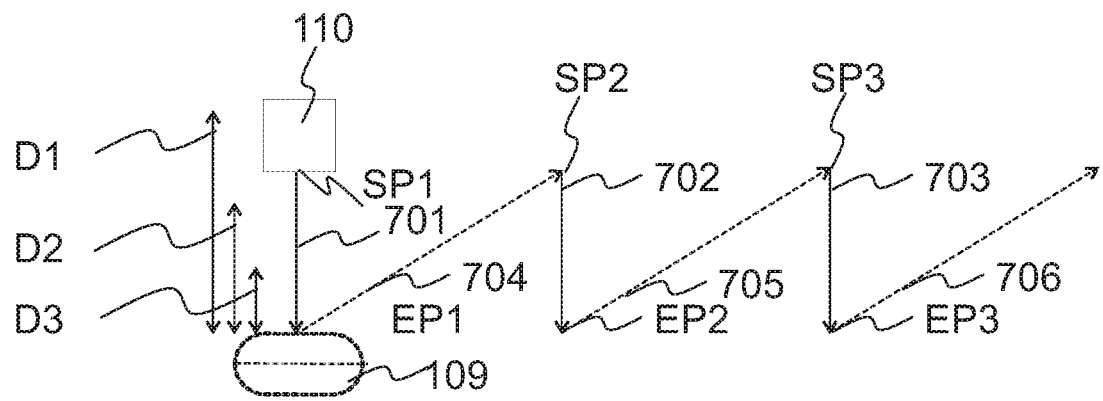
FIG. 7 shows, by way of example, a moving pattern of a camera sensor in relation to the specimen stage.
Figure 7:
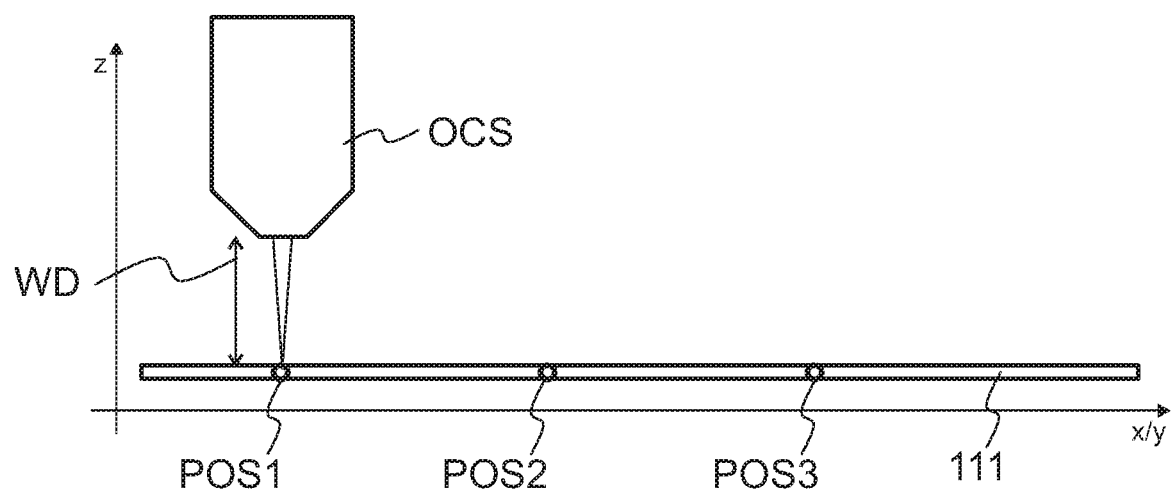

FIG. 7 shows, by way of example, a moving pattern of a camera sensor in relation to the specimen stage for changing focus. As described earlier, the coarse focus may be adjusted by moving the objective-camera system OCS and/or the specimen stage 111 such that the distance between the specimen and the objective-camera system OCS is at designed working distance WD. The fine focus may be adjusted by moving the camera sensor 110 along the z-axis in continuous motion while capturing images, and the working distance is kept constant. The camera sensor 110 may be configured to move along the z-axis. The specimen may be set on a glass on the stage 111. The focus may be changed by changing the distance between the camera sensor and the tube lens. The distance D1, D2, D3 between the camera sensor 110 and the tube lens 109 may be changed e.g. by moving the camera sensor 110. The camera sensor may be moved in continuous motion along the z-axis. The camera sensor may be moved in continuous motion from a first starting point SP1 to a first end point EP1. The camera sensor may be configured to capture a plurality of images from a first position POS1 in x-y plane while the camera sensor is in continuous motion from the first starting point SP1 to the first end point EP1. The camera sensor may be configured to capture images at high frame rate while the focus, i.e. the distance between the camera sensor and the tube lens, is changing in continuous motion. The flash may be synchronized with image capture. Solid arrows 701, 702, 703 describe movement of the camera sensor 110 in relation to the stage 111 during which images are captured. Dashed arrows 704, 705, 706 describe movement of the camera sensor 110 in relation to the stage 111 during which images are not captured. At least the x/y-component of the movement described by the dashed arrows 704, 705, 706 is realized by moving the specimen stage.

The camera sensor may be configured to capture a first plurality of images from the first position POS1 while the focus is changing. Capturing the first plurality of images while the focus is changing means that an image A of the first plurality of images may be captured when the camera sensor is at distance 1 (D1) from the tube lens 109, an image B of the first plurality of images may be captured when the camera sensor is at distance 2 (D2) from the tube lens 109, and image C of the first plurality of images may be captured when the camera sensor is at distance 3 (D3) from the tube lens 109. The first plurality of images may comprise images each captured with different focus from the first position POS1. The image frames captured with different focus forms an image stack. The process of capturing plurality of images described in this paragraph applies for capturing the second plurality of images and the third plurality of images below, mutatis mutandis.

The specimen stage may be moved in x-y plane such that the second position POS2 to be imaged is in correct position under the objective-camera system OCS. The camera sensor 110 may be configured to reach a second starting point SP2 from which to start the focus motion along the z-axis towards a second end point EP2. The camera sensor 110 may be configured to move in continuous motion along the z-axis from the second starting point SP2 to the second end point SP2. The camera sensor may be configured to capture a second plurality of images from the second position POS2 while the focus is changing. The flash may be synchronized with image capture.

The specimen stage may be moved in x-y plane such that the third position POS3 to be imaged is in correct position under the objective-camera system OCS. The camera sensor 110 may be configured to reach a third starting point SP3 from which to start the focus motion along the z-axis towards a third end point EP3. The camera sensor 110 may be configured to move in continuous motion along the z-axis from the third starting point SP3 to the third end point SP3. The camera sensor may be configured to capture a third plurality of images from the third position POS3 while the focus is changing. The flash may be synchronized with image capture.

Relative moving patterns shown in FIG. 5 and FIG. 6 may be used as alternatives to the moving patterns shown in FIG. 7.

Figure 8:
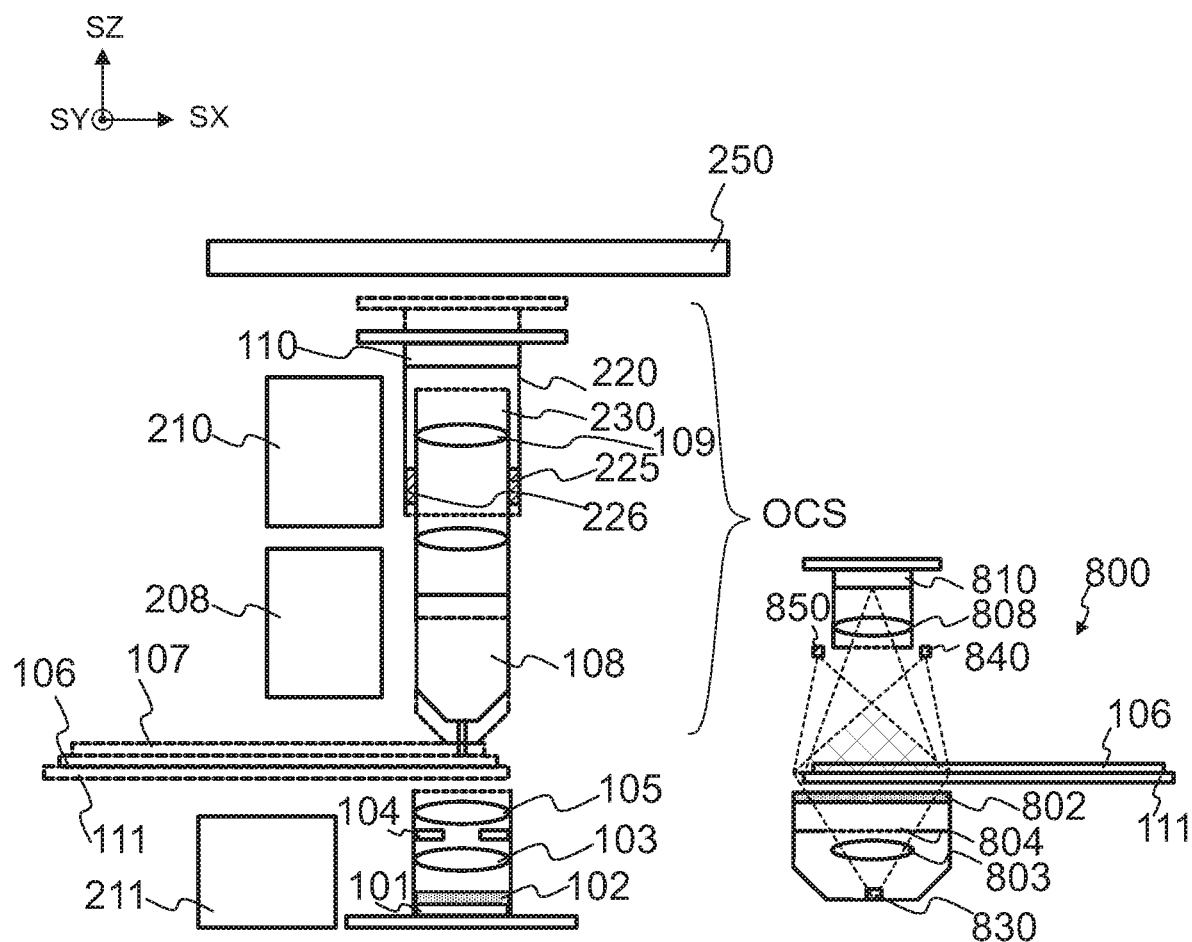
FIG. 8 shows, by way of example, components of a scanning apparatus.

FIG. 8 shows, by way of example, components of the scanning apparatus 100. The scanning apparatus 100 may further comprise a secondary camera module 800. The secondary camera module 800 may comprise a secondary camera 810. The secondary camera may be used to provide an overview of the sample. The slide 106 may comprise markings such as metadata regarding the specimen to be scanned. The markings may be imaged by the secondary camera 810. The image acquired by the secondary camera may be used to determine the area to be scanned. The secondary camera module 800 may comprise lights 830, 840, 850 for illuminating the specimen. The lights 830, 840, 850 for the secondary camera may be LED lights. The secondary camera module 800 may comprise a collector 803. The secondary camera module 800 may comprise a diaphragm 804. The secondary camera module 800 may comprise a diffuser 802. The secondary camera module 800 may comprise an objective 808 for providing magnified view of the specimen for the secondary camera 810. The specimen stage 111 may be configured to move in x/y-plane to the secondary camera module to be imaged by the secondary camera. After determining the area to be scanned, the specimen stage may be configured to move under the objective-camera system OCS to be scanned.

FIG. 9 shows, by way of example, a flowchart of a method for scanning microscope slides. The specimen may be scanned using the apparatus according to the present application. The method may comprise changing 910 focus of the scanning apparatus in continuous motion. The method may comprise capturing 920 a first plurality of images from a first position at a first rate while the focus is changed in continuous motion. The method may comprise flashing a flash unit at a second rate, wherein the first rate and the second rate are synchronized.

Changing focus may comprise moving the camera sensor along the optical axis in continuous motion. This way, the distance between the camera sensor and the tube lens may be changed. Alternatively or in addition, the distance between the camera sensor and the tube lens may be changed by changing the focal length of the liquid tube lens.

Changing focus may comprise changing a distance between an objective and the specimen stage. The distance between an objective and the specimen stage may be changed by moving an objective-camera system (OCS) in continuous motion along the optical axis. Alternatively or in addition, the distance between an objective and the specimen stage may be changed by moving the specimen stage in continuous motion along the optical axis.

The method may comprise capturing the first plurality of images at a first rate while the focus is changed in continuous motion and the specimen stage is moved in continuous motion along the plane orthogonal to the optical axis.

A first focused frame of the first plurality of images may be determined. Properly focused image may be chosen from the acquired first plurality of images from the first position. Contrast of the frames of the first plurality of images may be determined. Contrast may be determined e.g. by the relationship between the highest and lowest intensity in an image. For example, MTF may be used in determination of the contrast. The intensity values of the image pixels may be filtered using a digital high-pass or band-pass filter. Contrasts of the frames of the first plurality of images may be compared. The frame having the highest contrast may be selected and designated as a first focused frame. The contrast comparison may be carried out for the frames of the second plurality of images and for the frames of the third plurality of images.

Former focusing information may be used when scanning the neighbouring locations in x/y plane. The number of frames needed to be captured from each position in x/y plane may be decreased. The focusing information of the first focused image may be determined e.g. from metadata of the frame. The focusing information may comprise e.g. the working distance and/or the distance between the camera sensor and the tube lens and/or the focal length of the liquid lens. The focusing information of the first focused frame may be used in determination of the second starting point SP2. Starting point of the next focus range may be determined based, at least partly, on the focusing information of focused frames of neighbouring locations. For example, focus search range for a second zone may be determined from the focus point (e.g. the working distance used when capturing the properly focused frame) of a first zone by adding margins of depth (z-axis) tolerance so that a focus peak may be detected from a sequence of frames of the second zone. A second plurality of images may be captured from a second position while the focus is changed in continuous motion along the optical axis from the second starting point SP2 to a second end point EP2. The focus may be changed e.g. by moving the camera, by moving the specimen stage and/or by moving the objective-camera system.

A second focused image of the second plurality of images may be determined as the first focused image above. Properly focused image may be chosen from the acquired second plurality of images from the second position. The first focused image and the second focused image are the sub-images of the specimen. The sub-images of the specimen may be combined by stitching to form a final image. Stitching process may comprise e.g. image registration, image warping, and blending of the images, as described above.

Different colours of the specimen may be focused separately. The multi-colour LED flash may be used when acquiring the images. For example, a first plurality of images is acquired using a flash of a first colour. The process of acquiring the first plurality of images may be repeated using a flash of a second colour. The process of acquiring the first plurality of images may be repeated using a flash of a third colour. When the colour of the flash is known, the colours of the object, e.g. the specimen, may be reproduced correctly to the resulting image. As an alternative to repeating the process of acquiring the first plurality of images, image frames (A, B and C) of the first plurality of images may be acquired in the following way: image A using a flash of a first colour, image A using a flash of a second colour, image A using a flash of a third colour; image B using a flash of a first colour, image B using a flash of a second colour, image B using a flash of a third colour; image C using a flash of a first colour, image C using a flash of a second colour, image C using a flash of a third colour. The first, second and third colour may be red, green and blue, respectively. The resulting image may be an RGB image having three channels: red, green and blue. Possible differences in zoom levels of images of different channels may be corrected by resizing the images by stretching and/or squeezing. Proper focus for each colour may be determined by comparing contrast, as described above. Focus search range may be determined for each colour.

Figure 10A:
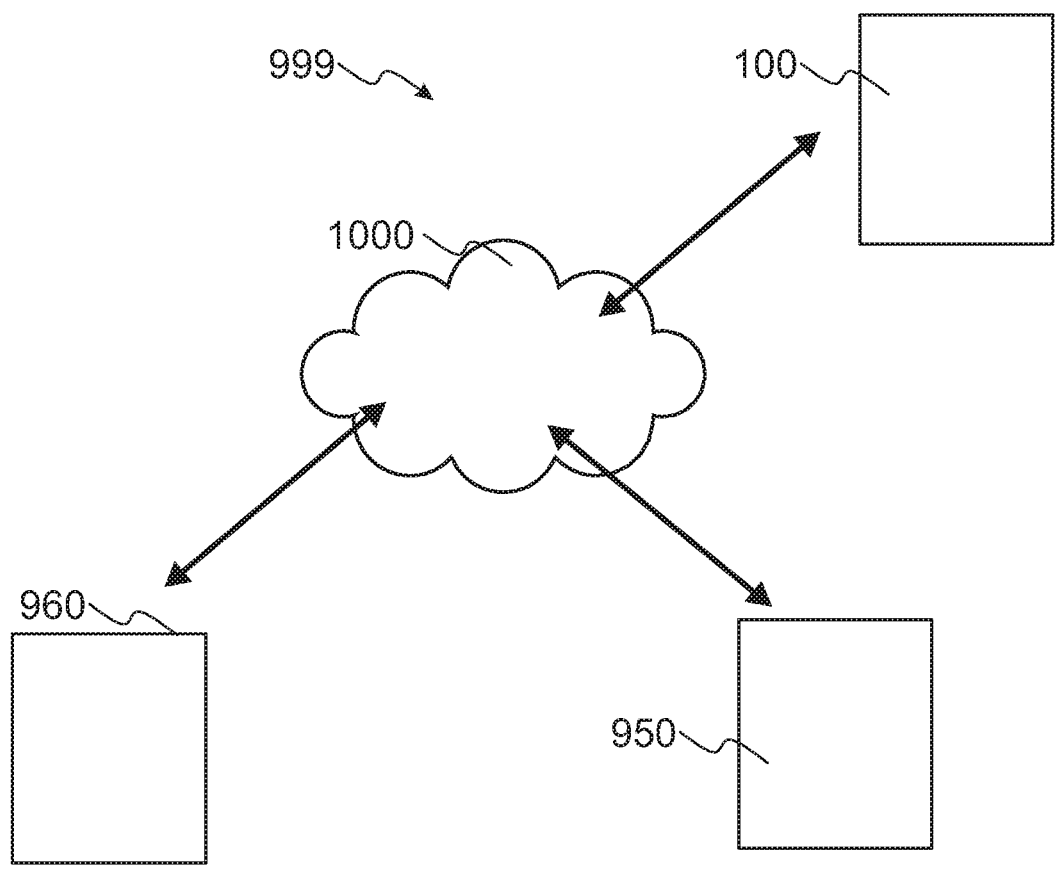
FIG. 10a shows, by way of example, a system and devices for investigating microscope slides.

FIG. 10a shows a system and devices for investigating microscope slides. The different devices may be connected via a communication connection 1000, for example via internet, a local radio network or a mobile communication network. The system 999 may comprise a first apparatus 100. The first apparatus 100 may be a microscope slide scanner. The microscope slide scanner may be the scanning apparatus 100 as disclosed in the present application. The system 999 may comprise a database 950. The images acquired by the first apparatus may be saved e.g. in a database 950. One or more servers may form the database. The servers may individually, in groups or all together process and store images. The servers may form a server system, e.g. a cloud. The system 999 may comprise a second apparatus 960. The second apparatus 960 may be e.g. a personal computer 960 or a smartphone. The second apparatus may receive images acquired by the first apparatus. The images may be received from the database or from the first apparatus via the communication connection 1000. User of the second apparatus 960, e.g. a pathologist, may view the images acquired with the first apparatus 100 e.g. on a screen of the second apparatus.

The apparatus 100 may comprise means for changing focus in continuous motion. The apparatus 100 may comprise means for capturing a first plurality of images from a first position at a first rate while the focus is changed in continuous motion. The apparatus 100 may comprise means for flashing a flash unit at a second rate, wherein the first rate and the second rate are synchronized. These means may comprise at least one processor, a memory, and a computer program code being stored in the memory.

Figure 10B:
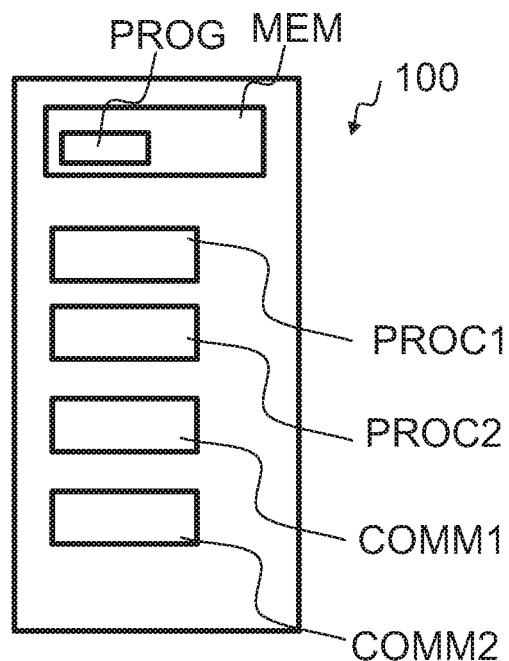
FIG. 10b shows, by way of example, a block diagram of the apparatus.

FIG. 10b shows, by way of example, a block diagram of the apparatus 100. The apparatus comprises memory MEM. The apparatus comprises computer program code PROG residing in the memory MEM for implementing, for example, scanning of microscope slides. The apparatus comprises one or more processors PROC1, PROC2 that, when running the computer program code PROG, cause the apparatus to carry out various embodiments of the method as disclosed herein. The apparatus may comprise communication modules COMM1, COMM2 for communicating with other devices, such as the database 950 and/or the personal computer 960. The apparatus may comprise circuitry and electronics for handling, receiving and transmitting data. The apparatus may comprise these elements, or fewer or more elements.

The invention claimed is:

1. A microscope slide scanner comprising:
an objective-camera system comprising an objective and a rolling shutter camera sensor; and a specimen stage,
wherein the objective-camera system is configured to change position in relation to the specimen stage in a continuous motion along an optical axis, and
wherein the rolling shutter camera sensor is configured to capture a first plurality of images from a first position at a first rate while focus is simultaneously changed in a continuous motion by moving the objective-camera system in the continuous motion along the optical axis, wherein the captured first plurality of images comprises image frames captured with different focus from the first position;
a multi-color strobe flash unit configured to produce a light pulse at a second rate, wherein the first rate and the second rate are synchronized such that during the light pulse each line of an image frame is exposed simultaneously,
wherein the first plurality of images is created by using a flash of a first color emitted by the multi-color strobe flash unit,
wherein the rolling shutter camera sensor is configured to capture a second plurality of images with a second color emitted by the multi-color strobe flash unit, and a third plurality of images with a third color emitted by the multi-color strobe flash unit, the first color being different from the second color or the third color, and the second color being different from the third color, and
wherein the microscope slide scanner is configured to choose a properly focused image for each color from the captured images.

2. The microscope slide scanner according to claim 1,
wherein the rolling shutter camera sensor is configured to change position along an optical axis in a continuous motion; and
wherein the focus is changed by moving the rolling shutter camera sensor along the optical axis in the continuous motion.

3. The microscope slide scanner according to claim 1, wherein the specimen stage is configured to change position in relation to the objective in the continuous motion along the optical axis; and wherein the focus is changed by moving the specimen stage in the continuous motion along the optical axis.

4. The microscope slide scanner according to claim 1, wherein the rolling shutter camera sensor is configured to capture the first plurality of images at the first rate while the focus is changed in the continuous motion by moving the objective-camera system in the continuous motion along the optical axis and the specimen stage is configured to simultaneously change position in the continuous motion along the plane orthogonal to the optical axis.

5. The microscope slide scanner according to claim 1, further comprising a shape-changing lens, and wherein the focus is changed by changing shape of the shape-changing lens.

6. The microscope slide scanner according to claim 1, wherein the specimen stage is configured to move such that a second position to be imaged is in a correct position under the objective.

7. The microscope slide scanner according to claim 1, further comprising a shape-changing lens, and wherein a coarse focus is adjusted by moving the objective-camera system; and a fine focus is adjusted by changing shape of the shape-changing lens.

8. A method for scanning a specimen on a specimen stage, the method comprising:
changing a focus of a scanning apparatus in a continuous motion by moving an objective-camera system comprising an objective and a rolling shutter camera sensor in the continuous motion along an optical axis;
capturing, by the rolling shutter camera sensor, a first plurality of images from a first position at a first rate while the focus is simultaneously changed in the continuous motion by moving the objective-camera system in the continuous motion along the optical axis, wherein the captured first plurality of images comprises image frames captured with a different focus from the first position;
producing, by a strobe flash unit, a light pulse at a second rate, wherein the first rate and the second rate are synchronized such that during the light pulse each line of an image frame is exposed simultaneously;
wherein the first plurality of images is created by using a flash of a first color emitted by the strobe flash unit,
repeating the capturing step to capture a second plurality of images by using a second color emitted by the strobe flash unit, repeating the capturing step to captured a third plurality of images by using a third color emitted by the strobe flash unit, the first color being different from the second color or the third color, and the second color being different from the third color; and
choosing a properly focused image for each color from the captured images.

9. The method according to claim 8, wherein the changing the focus comprises moving the rolling shutter camera sensor along the optical axis in the continuous motion.

10. The method according to claim 8, wherein a distance between the objective and the specimen stage is changed by moving the specimen stage in the continuous motion along the optical axis.

11. The method according to claim 8, further comprising capturing the first plurality of images at the first rate while the focus is changed in the continuous motion by moving the objective-camera system in the continuous motion along the optical axis and the specimen stage is simultaneously moved in the continuous motion along a plane orthogonal to the optical axis.

12. The method according to claim 8, further comprising determining a first focused frame of the first plurality of images.

13. The method according to claim 12, wherein the determining the first focused image comprises
determining a contrast of the first plurality of images;
selecting a frame having a highest contrast; and
designating the frame having the highest contrast as the first focused frame.

14. The method according to claim 8, wherein changing the focus comprises changing a shape of a shape-changing lens of the objective-camera system.

15. The method according to claim 8, further comprising focusing different colors of the specimen at different distances.

* * * * *